United States Patent
Shin (10) Patent No.: US 9,797,302 B2
(45) Date of Patent: Oct. 24, 2017

(54) ENGINE CONTROL SYSTEM WITH VARIABLE TURBOCHARGER AND METHOD THEREOF

(71) Applicants: Hyundai Motor Company, Seoul (KR); Kia Motors Corporation, Seoul (KR)

(72) Inventor: Buom-sik Shin, Seongnam-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 398 days.

(21) Appl. No.: 14/559,891

(22) Filed: Dec. 3, 2014

(65) Prior Publication Data

US 2015/0354443 A1    Dec. 10, 2015

(30) Foreign Application Priority Data

Jun. 5, 2014 (KR) .................. 10-2014-0068268

(51) Int. Cl.
*F02B 37/22* (2006.01)
*F02B 37/24* (2006.01)
(Continued)

(52) U.S. Cl.
CPC .............. *F02B 37/22* (2013.01); *F02B 37/24* (2013.01); *F02D 41/0007* (2013.01);
(Continued)

(58) Field of Classification Search
CPC ........ F02B 37/22; F02B 37/24; F02D 41/107; F02D 41/401; F02D 41/0007; F02D 2200/501; Y02D 10/44; Y02D 10/144
(Continued)

(56) References Cited

U.S. PATENT DOCUMENTS 4,794,759 A * 1/1989 Lyon .................. F01D 17/165
60/602
4,961,319 A * 10/1990 Lyon .................. F01D 17/165
60/602

(Continued)

FOREIGN PATENT DOCUMENTS

JP      8-270454 A    10/1996
JP      4339599 B2    10/2009
(Continued)

*Primary Examiner* — Jason Shanske
*Assistant Examiner* — Jason T Newton
(74) *Attorney, Agent, or Firm* — Morgan, Lewis & Bockius LLP (57) ABSTRACT

An engine control system with a variable turbocharger may include an engine including a cylinder generating power by combustion of a fuel, a variable turbocharger including a turbine rotated by exhaust gas exhausted by the engine, and a compressor rotated in synchronization with the turbine and compressing external air and supplying the compressed air to the cylinder, a vane adjusting flow area of exhaust gas supplied to the turbine, and a controller dividing an operation region of a vehicle into a steady-speed driving region, an acceleration driving region, and a deceleration driving region from a fuel amount supplied to the cylinder and a required torque of the engine, and controlling opening of the vane and an injection timing of fuel injected into the cylinder.

13 Claims, 10 Drawing Sheets (51) Int. Cl.
  *F02D 41/00* (2006.01)
  *F02D 41/10* (2006.01)
  *F02D 41/40* (2006.01)
(52) U.S. Cl.
  CPC ......... *F02D 41/107* (2013.01); *F02D 41/401* (2013.01); *F02D 2200/501* (2013.01); *Y02T 10/144* (2013.01); *Y02T 10/44* (2013.01)
(58) Field of Classification Search
  USPC ........................................................ 60/605.1
  See application file for complete search history.

(56) References Cited

U.S. PATENT DOCUMENTS

| | | | | |
|---|---|---|---|---|
| 6,338,245 | B1* | 1/2002 | Shimoda | F02D 13/0234 60/278 |
| 2003/0060328 | A1* | 3/2003 | Beaty | B60W 10/06 477/109 |
| 2003/0121263 | A1* | 7/2003 | Hidaka | F02B 37/24 60/602 |
| 2003/0217732 | A1* | 11/2003 | Kataoka | F02B 1/12 123/276 |
| 2003/0230276 | A1* | 12/2003 | Kataoka | F02B 1/12 123/295 |
| 2008/0046128 | A1* | 2/2008 | Sasaki | F02D 35/026 700/274 |
| 2008/0221780 | A1* | 9/2008 | Ishikawa | F02B 23/0651 701/104 |
| 2009/0306866 | A1* | 12/2009 | Malikopoulos | B60W 30/1882 701/59 |
| 2013/0197778 | A1* | 8/2013 | Rodriguez | F02D 45/00 701/102 |
| 2013/0197779 | A1* | 8/2013 | Seiberlich | F02D 41/2422 701/102 |
| 2014/0053811 | A1* | 2/2014 | De Ojeda | F02D 41/00 123/435 |
| 2015/0204257 | A1* | 7/2015 | Osumi | F02D 41/0062 123/564 |

FOREIGN PATENT DOCUMENTS

| | | |
|---|---|---|
| JP | 4928512 B2 | 5/2012 |
| JP | 2013-194682 A | 9/2013 |
| KR | 10-2004-0057443 A | 7/2004 |
| KR | 10-0802762 B1 | 2/2008 |
| KR | 10-0980958 B1 | 9/2010 |

* cited by examiner

Opening of vane

Increment of opening of vane ← → Decrement of opening of vane

ENGINE CONTROL SYSTEM WITH VARIABLE TURBOCHARGER AND METHOD THEREOF

CROSS-REFERENCE TO RELATED APPLICATION

The present application claims priority to Korean Patent Application No. 10-2014-0068268 filed Jun. 5, 2014, the entire contents of which is incorporated herein for all purposes by this reference.

BACKGROUND OF THE INVENTION

Field of the Invention

The present invention relates to an engine control system with a variable turbocharger, and a method thereof. More particularly, the present invention relates to an engine control system with a variable turbocharger and a method thereof in which an operation region is divided into a steady-speed driving region, an acceleration driving region, and a deceleration driving region, and in which the variable turbocharger and an engine are controlled according to the operation region.

Description of Related Art

As is known in the art, when air at a higher pressure than atmospheric pressure is charged into an engine, a large amount of air can be supplied thereto. In addition, output power of the engine is increased when an amount of injected fuel is increased.

A turbocharger that turbocharges air to the engine is used. The turbocharger rotates a turbine using exhaust gas, and a blower connected thereto through a shaft is rotated. Therefore, the turbocharger compresses external air and supplies the compressed air to a cylinder of the engine.

Figure 1:
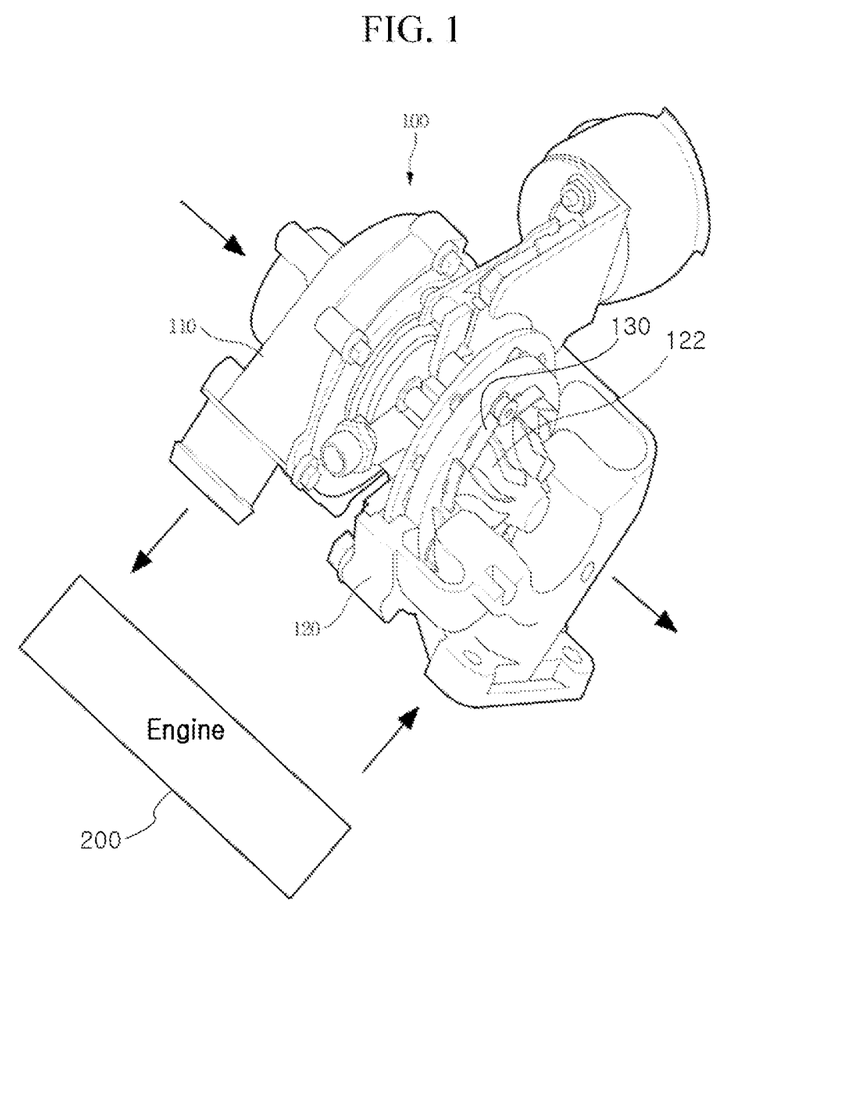
FIG. 1 is a perspective view illustrating a general turbocharger.
Figure 2A:
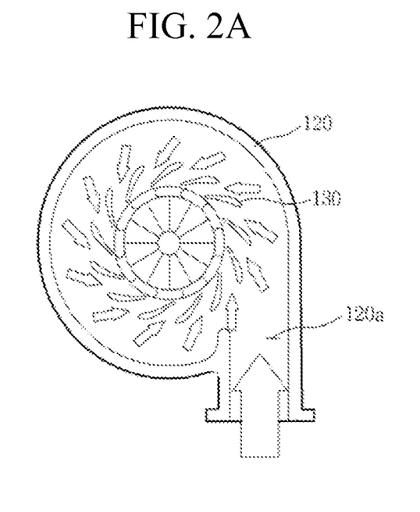
FIG. 2A and FIG. 2B are schematic views illustrating a general turbocharger.
Figure 2B:
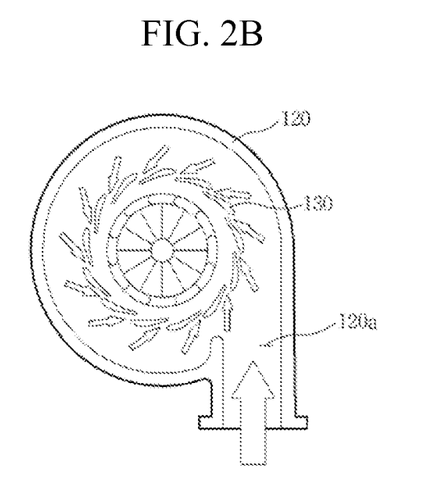

FIG. 1 is a perspective view illustrating a general turbocharger, and FIG. 2A and FIG. 2B are schematic views illustrating a general turbocharger.

As shown in FIG. 1, the general turbocharger 100 is one in which a flow passage area of exhaust gas is varied according to a variation of a vane angle. Therefore, output power of an engine 200 is changed. This type of turbocharger is called a variable turbocharger (VGT: variable geometry turbocharger). The turbocharger includes a turbine 122 rotated by exhaust gas exhausted by the engine 200, and a compressor 110 that is rotated in synchronization with the turbine 122 and that compresses external air and supplies the compressed air to a cylinder.

A vane is provided in a turbine housing 120. The vane 130 varies a flow passage area of exhaust gas according to an operation region of the engine such that output power of the engine is controlled. That is, the operation region of the engine is divided into a high-speed region and a low-speed region, and output power of the engine is controlled by adjusting an opening of the vane.

However, according to the conventional art, the turbocharger is operated in the operation region of the engine (high-speed region or low-speed region) such that there is a problem that control is not performed considering a steady-speed driving region, an acceleration driving region, or a deceleration driving region.

Further, according to the conventional art, it is possible to control an air-fuel ratio by increasing a boost pressure in a normal condition of the engine. However, since required boost pressure is not instantaneously formed because of turbo-lag in the acceleration driving region, there is a problem that the air-fuel ratio is not fluently controlled.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an engine control system with a variable turbocharger and a method for minimizing fuel consumption and exhaust gas by controlling the turbocharger and fuel injection considering a steady-speed driving region or an acceleration driving region.

According to various aspects of the present invention, an engine control system with a variable turbocharger may include an engine including a cylinder generating power by combustion of a fuel, a variable turbocharger including a turbine rotated by exhaust gas exhausted by the engine, and a compressor rotated in synchronization with the turbine and compressing external air and supplying the compressed air to the cylinder, a vane adjusting flow area of exhaust gas supplied to the turbine, and a controller dividing an operation region of a vehicle into a steady-speed driving region, an acceleration driving region, and a deceleration driving region from a fuel amount supplied to the cylinder and a required torque of the engine, and controlling opening of the vane and injection timing of fuel injected into the cylinder.

The controller may determine that the operation region is the steady-speed driving region when an absolute value of a differential value of the fuel amount supplied to the cylinder or an absolute value of a differential value of the required torque of the engine is less than a predetermined value, determine that the operation region is the acceleration driving region when the absolute value of the differential value of the fuel amount supplied to the cylinder or the absolute value of the differential value of the required torque of the engine is greater than or equal to the predetermined value and the differential value of the fuel amount or the differential value of the required torque is greater than zero, and determine that the operation region is the deceleration driving region when the absolute value of the differential value of the fuel amount supplied to the cylinder or the absolute value of the differential value of the required torque of the engine is greater than or equal to the predetermined value and the differential value of the fuel amount or the differential value of the required torque is less than zero.

The controller may control such that the injection timing is advanced and the opening of the vane is increased when the operation region is the steady-speed driving region.

The controller may control such that the injection timing is retarded and the opening of the vane is decreased when the operation region is the acceleration driving region.

The controller may control such that the opening of the vane is decreased when the operation region is the deceleration driving region.

According to various aspects of the present invention, an engine control method including a variable turbocharger, an engine, and a controller controlling the variable turbocharger and the engine in which the controller executes a series of commands may include measuring a fuel amount supplied to a cylinder of the engine and a required torque of the engine, determining whether an operation region is a steady-speed driving region, an acceleration driving region, or a deceleration driving region from the fuel amount supplied to the cylinder and the required torque of the engine, and controlling injection timing of fuel injected into the cylinder and opening of a vane provided in the turbocharger.

Determining the operation region may include differentiating the fuel amount supplied to the cylinder or the required torque of the engine, comparing an absolute value of a differential value of the fuel amount or an absolute value of a differential value of the required torque to a predetermined value, and determining whether the differential value of the fuel amount or the required torque is greater than zero.

The controller may determine that the operation region is the steady-speed driving region when the absolute value of the differential value of the fuel amount or the absolute value of the differential value of the required torque of the engine is less than the predetermined value.

The controller may determine that the operation region is the acceleration driving region when the absolute value of the differential value of the fuel amount supplied to the cylinder or the absolute value of the differential value of the required torque of the engine is greater than or equal to the predetermined value, and the differential value of the fuel amount or the differential value of the required torque is greater than zero.

The controller may determine that the operation region is the deceleration driving region when the absolute value of the differential value of the fuel amount supplied to the cylinder or the absolute value of the differential value of the required torque of the engine is greater than or equal to the predetermined value and the differential value of the fuel amount or the differential value of the required torque is less than zero.

The controller may control such that that the injection timing is advanced and the opening of the vane is increased when the operation region is the steady-speed driving region.

The controller may control such that the injection timing is retarded and the opening of the vane is decreased when the operation region is the acceleration driving region.

The controller may control such that the opening of the vane is decreased when the operation region is the deceleration driving region.

According to various embodiments of the present invention, since the opening of the vane and the injection timing of fuel is controlled according to the steady-speed driving region, the acceleration driving region, and the deceleration driving region, fuel consumption is improved and exhaust gas is minimized.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An engine control system with a variable turbocharger according to various embodiments of the present invention of FIG. 3 will now be described in detail with reference to FIG. 1, FIG. 2A, FIG. 2B and FIG. 3.

FIG. 1 is a perspective view illustrating a general turbocharger. FIG. 2A and FIG. 2B are schematic views illustrating a general turbocharger. FIG. 3 is a block diagram illustrating an engine control system with a variable turbocharger according to various embodiments of the present invention.

Figure 3:
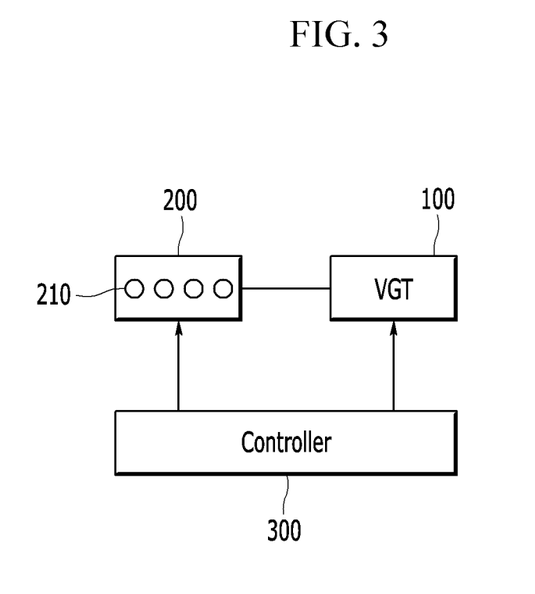
FIG. 3 is a block diagram illustrating an exemplary engine control system with a variable turbocharger according to the present invention.

As shown in FIG. 1, FIG. 2A, FIG. 2B and FIG. 3, an engine control system with a variable turbocharger according to various embodiments of FIG. 3 includes an engine 200 generating power, a variable turbocharger turbocharging compressed air into the engine 200, and a controller 300 controlling the engine 200 and the variable turbocharger.

A cylinder 210 (see FIG. 3) is provided in the engine 200, and power is generated by combustion of fuel flowing into the cylinder 210.

The variable turbocharger includes a turbine 122 rotated by exhaust gas exhausted by the engine 200, and a compressor 110 rotated in synchronization with the turbine 122 and compressing external air and supplying the compressed air to the cylinder 210.

The turbine 122 is provided in a turbine housing 120 and rotated by the exhaust gas. A vane 130 is provided in the turbine housing 120. The vane adjusts flow area of exhaust gas that is exhausted from the engine 200 to be supplied to the turbine 122. When an opening of the vane 130 is adjusted, flow resistance of exhaust gas flowing through a flow path formed in the turbine housing 120 is changed and output power of the engine 200 is adjusted.

A blower is mounted in the compressor 110, and the blower is rotated in synchronization with the turbine 122. External air is compressed by rotation of the blower and the compressed air is supplied to the engine 200.

The controller 300 can be realized by one or more processors activated by a predetermined program, and the predetermined program can be programmed to perform each step of an engine control method according to various embodiments of the present invention.

The controller 300 divides an operation region of a vehicle into a steady-speed driving region, an acceleration driving region, and a deceleration driving region from a fuel amount supplied to the cylinder 210 and a required torque of the engine 200, and controls an opening of the vane 130 and injection timing of fuel injected into the cylinder 210.

Figure 4:
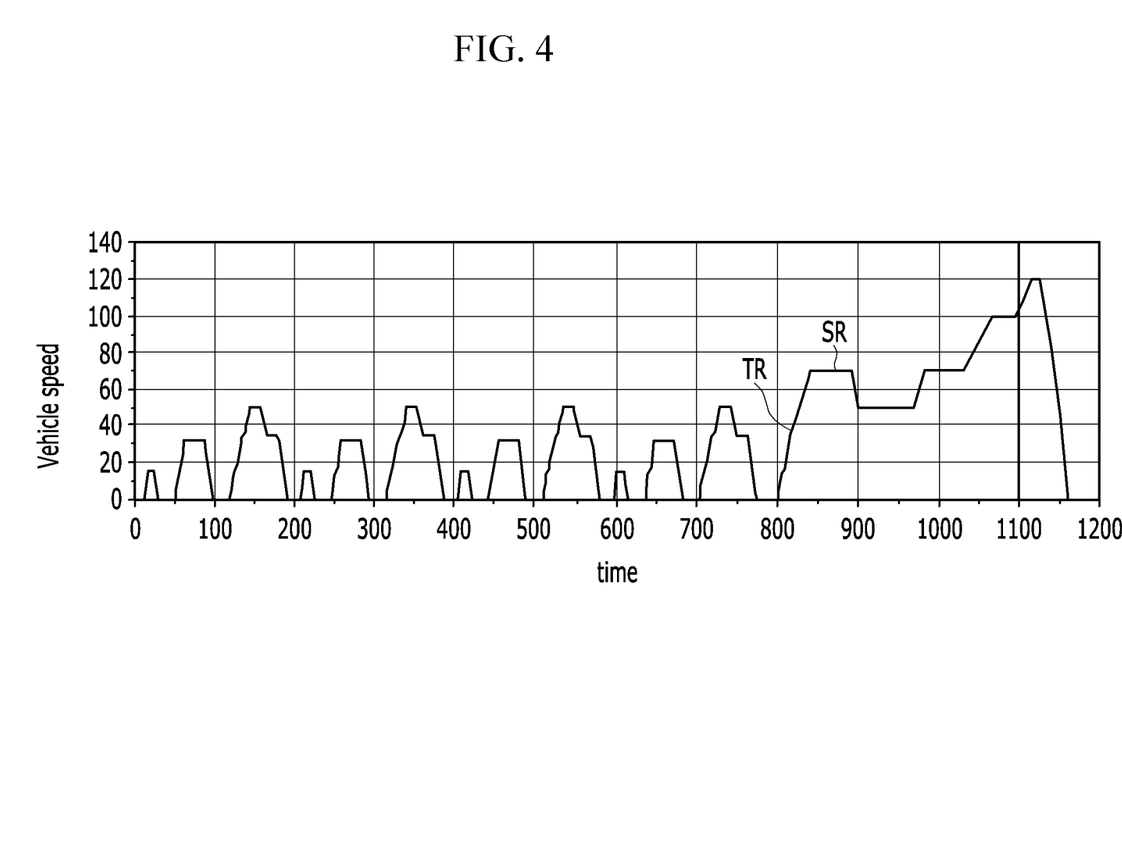
FIG. 4 is a graph explaining an operation region of a vehicle.

Referring to FIG. 4, when the operation region of the vehicle is the steady-speed driving region (SR), the amount of exhaust gas exhausted from the engine 200 is relatively low, and a large amount of air does not need to be supplied to the cylinder 210. As shown in FIG. 4, a frequency of traveling in the steady-speed driving region (SR) is relatively high.

Therefore, the controller 300 preferentially performs control for enhancement of fuel consumption when the operation region of the vehicle is the steady-speed driving region.

When the operation region of the vehicle is the acceleration driving region (TR), the amount of exhaust gas exhausted from the engine 200 is relatively high, and a large amount of air needs to be supplied to the cylinder 210. As shown in FIG. 4, a frequency of traveling in the acceleration driving region (TR) is relatively low.

Therefore, the controller 300 preferentially performs control for reducing exhaust gas when the operation region of the vehicle is the acceleration driving region.

An engine control method with a variable turbocharger according to various embodiments of the present invention will now be described in detail with reference to FIG. 5 and FIG. 6.

Figure 5:
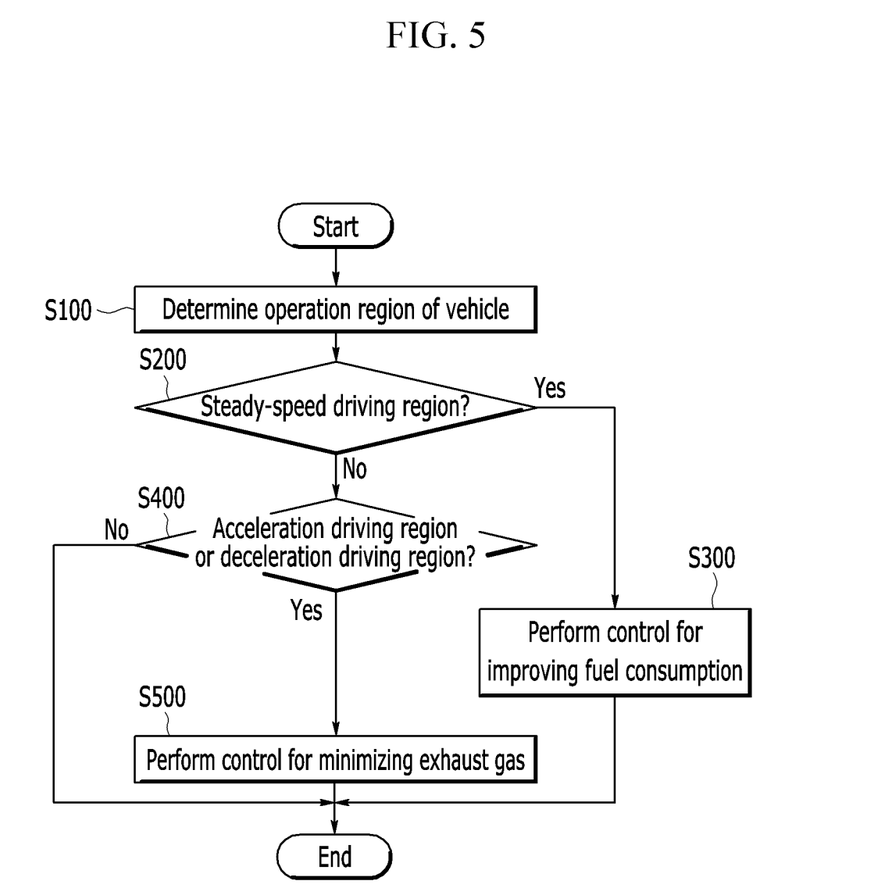
FIG. 5 and FIG. 6 are flowcharts showing an exemplary engine control method according to the present invention.
Figure 6:
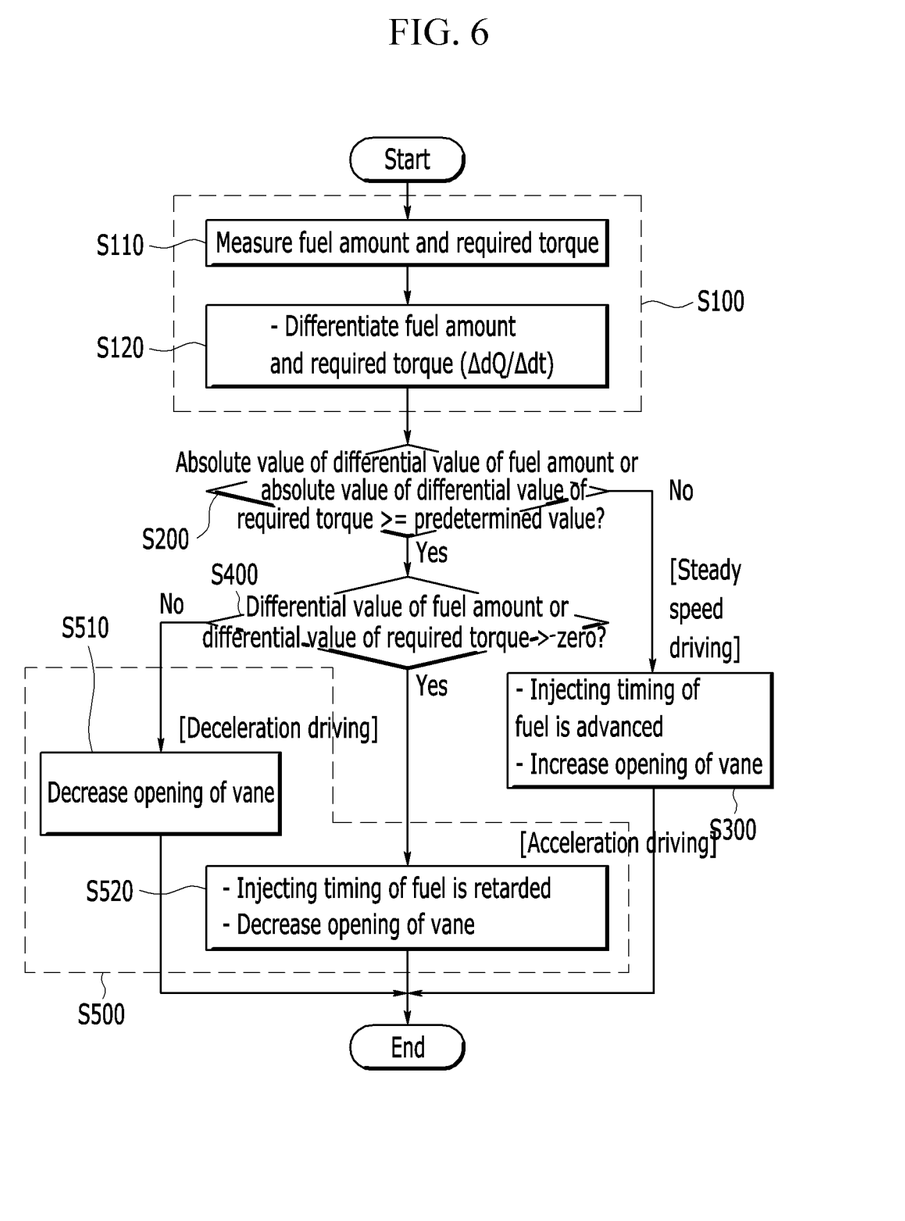

FIG. 5 and FIG. 6 are flowcharts showing an engine control method according to various embodiments of the present invention.

As shown in FIG. 5 and FIG. 6, the controller 300 determines the operation region of the vehicle at step S100. That is, the controller 300 determines the operation region of the vehicle by using the fuel amount supplied to the cylinder 210 and the required torque of the engine 200.

In particular, the controller 300 measures the fuel amount supplied to the cylinder 210 and the required torque of the engine 200 at step S110.

The controller 300 differentiates the measured fuel amount and the required torque at step S120. That is, the controller 300 determines the operation region of the vehicle by using a change rate of the fuel amount and the required torque.

The controller 300 determines whether the operation region of the vehicle is the steady-speed driving region at step S200. In particular, the controller 300 determines whether an absolute value of a differential value of the fuel amount or an absolute value of a differential value of the required torque is greater than or equal to a predetermined value at step S200.

If the absolute value of the differential value of the fuel amount or the absolute value of the differential value of the required torque is less than the predetermined value, the controller 300 determines that the operation region of the vehicle is the steady-speed driving region. When the operation region of the vehicle is the steady-speed driving region, the controller 300 preferentially performs control for improving fuel consumption. That is, the controller 300 controls the injection timing of fuel injected into the cylinder 210 to be advanced and the opening of the vane 130 to be increased at step S300.

When the injection timing of the fuel is advanced, fuel in the cylinder 210 is ignited in a state in which temperature and pressure of the cylinder 210 is relatively high, and thereby efficiency and torque of the engine 200 are increased. When the opening of the vane 130 is increased, flow resistance of exhaust gas is reduced and thereby fuel consumption is improved.

When the operation region of the vehicle is not the steady-speed driving region, the controller 300 determines whether the operation region of the vehicle is the acceleration driving region or the deceleration driving region at step S400. In particular, the controller 300 determines whether the differential value of the fuel amount or the differential value of the required torque is greater than zero when the absolute value of the differential value of the fuel amount or the absolute value of the differential value of the required torque is greater than or equal to the predetermined value at step S400.

If the differential value of the fuel amount or the differential value of the required torque is greater than zero, the controller 300 determines that the operation region of the vehicle is the acceleration driving region.

When the operation region of the vehicle is the acceleration driving region, the controller 300 preferentially performs control for minimizing exhaust gas. That is, the controller 300 controls the injection timing of the fuel to be retarded and the opening of the vane 130 to be decreased at step S520.

When the injection timing of the fuel is retarded, fuel in the cylinder 210 is ignited in a state in which temperature and pressure of the cylinder 210 are relatively low and thereby nitrogen oxide ($NO_x$) production is reduced. When the opening of the vane 130 is reduced, rotation speed of the compressor 110 is increased and thereby the amount of air flowing into the cylinder 210 of the engine 200 is relatively increased. Therefore, output power of the engine 200 is increased.

If the differential value of the fuel amount or the differential value of the required torque is less than zero, the controller 300 determines that the operation region of the vehicle is the deceleration driving region.

When the operation region of the vehicle is the deceleration driving region, the controller 300 decreases the opening of the vane 130 at step S510. The opening of the vane 130 is decreased, and thereby boost pressure is smoothly increased when the vehicle is re-accelerated.

FIG. 7A, FIG. 7B, FIG. 7C and FIG. 7D are graphs illustrating a relationship of exhaust gas and fuel consumption according to an opening of a vane.

Figure 7A:
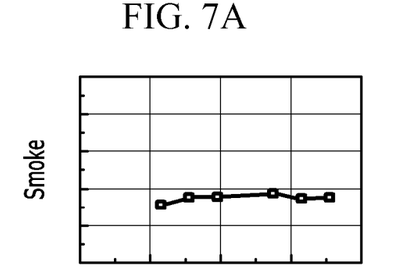
FIG. 7A, FIG. 7B, FIG. 7C and FIG. 7D are graphs illustrating a relationship of exhaust gas and fuel consumption according to an opening of a vane.

FIG. 7A is a graph illustrating a relationship between an amount of smoke and an opening of a vane. As shown in FIG. 7A, a difference of the amount of smoke according to the opening of the vane 130 is insignificant.

Figure 7B:
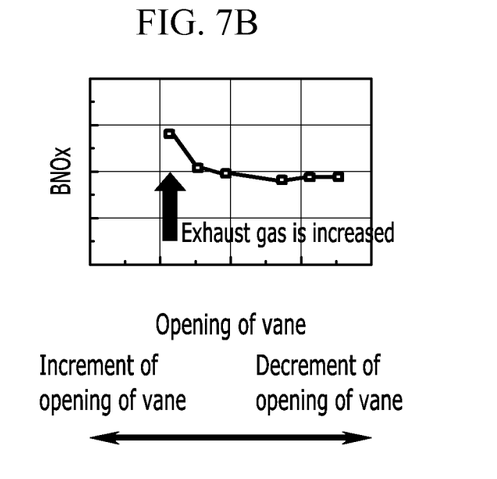

FIG. 7B is a graph illustrating a relationship between nitrogen oxide and an opening of a vane. As shown in FIG. 7B, nitrogen oxide is increased when the opening of the vane 130 is increased.

Figure 7C:
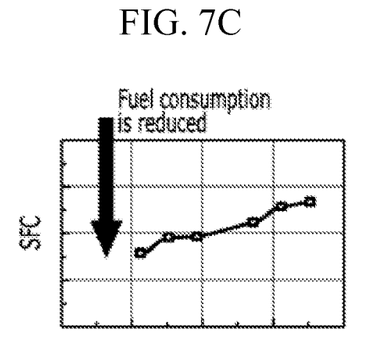

FIG. 7C is a graph illustrating a relationship between SFC (specific fuel consumption) per unit output and an opening of a vane. As shown in FIG. 7C, SFC is reduced when the opening of the vane 130 is increased.

Figure 7D:
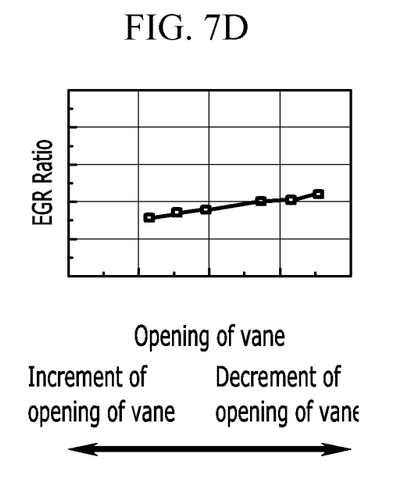

FIG. 7D is a graph illustrating a relationship between EGR (exhaust gas recirculation) ratio and an opening of a vane. As shown in FIG. 7D, the EGR ratio is reduced when the opening of the vane 130 is increased. That is, a large amount of exhaust gas is generated since recirculated exhaust gas is reduced. The EGR ratio is a ratio between intake air of the exhaust gas recirculation device and recirculating air.

FIG. 8A, FIG. 8B, FIG. 8C and FIG. 8D are graphs illustrating a relationship between exhaust gas and fuel consumption according to injection timing of the fuel.

Figure 8A:
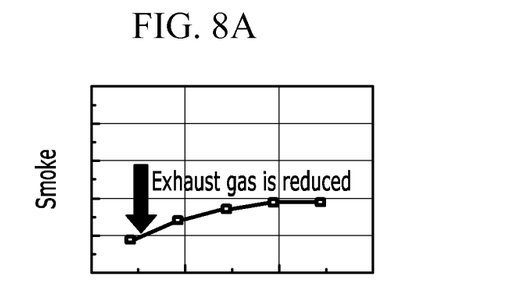
FIG. 8A, FIG. 8B, FIG. 8C, and FIG. 8D are graphs illustrating a relationship between exhaust gas and fuel consumption according to injection timing of fuel.

FIG. 8A is a graph illustrating a relationship between smoke and injection timing of the fuel. As shown in FIG. 8A, smoke exhausted from the engine is reduced when the injection timing of the fuel is retarded.

Figure 8B:
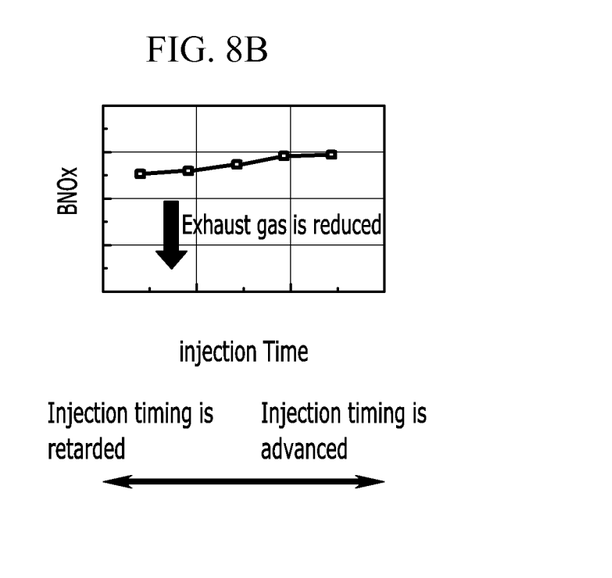

FIG. 8B is a graph illustrating a relationship between nitrogen oxide and injection timing of the fuel. As shown in FIG. 8B, nitrogen oxide is reduced when the injection timing of the fuel is retarded.

Figure 8C:
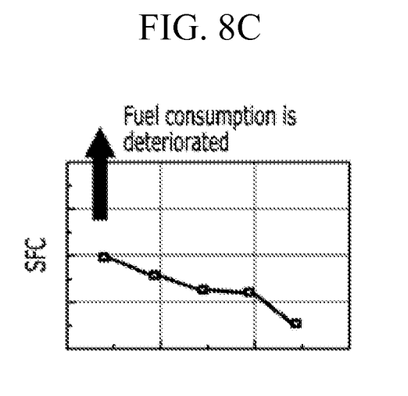

FIG. 8C is a graph illustrating a relationship between SFC (specific fuel consumption) per unit output and injection timing of the fuel. As shown in FIG. 8C, SFC is increased when the injection timing of the fuel is retarded.

Figure 8D:
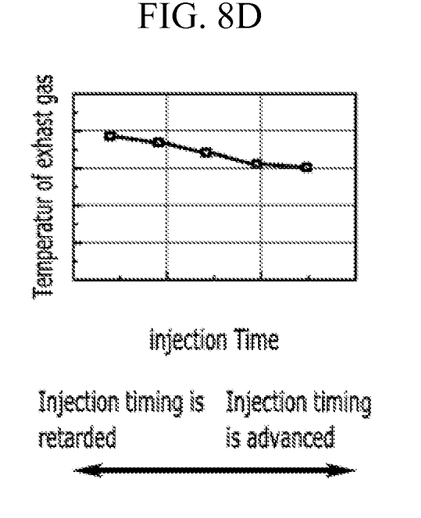

FIG. 8D is a graph illustrating a relationship between a temperature of the exhaust gas and injection timing of the fuel. As shown in FIG. 8D, the temperature of the exhaust gas is increased when the injection timing of the fuel is retarded. When the temperature of the exhaust gas is increased by retarding the injection timing of the fuel, the inlet temperature of the turbocharger is increased. Therefore, delay of an increment of boost pressure caused by turbo-lag can be prevented.

As shown in FIG. 7A, FIG. 7B, FIG. 7C, FIG. 7D, FIG. 8A, FIG. 8B, FIG. 8C and FIG. 8D, the engine control system and the control method of the variable turbocharger according to various embodiments of the present invention adjusts the opening of the vane 130 and the injection timing of the fuel according to the operation region of the vehicle. That is, the controller preferentially performs control for enhancement of fuel consumption when the operation region of the vehicle is the steady-speed driving region, and the controller preferentially performs control for reducing exhaust gas when the operation region of the vehicle is the acceleration driving region or deceleration driving region.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine control system with a variable turbocharger, comprising:
    an engine including a cylinder generating power by combustion of a fuel;
    the variable turbocharger including a turbine rotated by exhaust gas exhausted by the engine, and a compressor rotated in synchronization with the turbine and compressing external air and supplying the compressed air to the cylinder;
    a vane adjusting a flow area of exhaust gas supplied to the turbine; and
    a controller dividing an operation region of a vehicle into a plurality of driving regions including a steady-speed driving region, an acceleration driving region, and a deceleration driving region from a fuel amount supplied to the cylinder and a required torque of the engine, and controlling opening of the vane and an injection timing of fuel injected into the cylinder,
    wherein the plurality of driving regions are determined by comparing a predetermined value with an absolute value of a differential value of the fuel amount supplied to the cylinder or an absolute value of a differential value of the required torque of the engine.

2. The engine control system with the variable turbocharger of claim 1,
    wherein the controller:
    determines that the operation region is the steady-speed driving region when the absolute value of the differential value of the fuel amount supplied to the cylinder or the absolute value of the differential value of the required torque of the engine is less than the predetermined value,
    determines that the operation region is the acceleration driving region when the absolute value of the differential value of the fuel amount supplied to the cylinder or the absolute value of the differential value of the required torque of the engine is greater than or equal to the predetermined value, and the differential value of the fuel amount or the differential value of the required torque is greater than zero, and
    determines that the operation region is the deceleration driving region when the absolute value of the differential value of the fuel amount supplied to the cylinder or the absolute value of the differential value of the required torque of the engine is greater than or equal to the predetermined value and the differential value of the fuel amount or the differential value of the required torque is less than zero.

3. The engine control system with the variable turbocharger of claim 2,
    wherein the controller controls such that the injection timing is advanced and the opening of the vane is increased when the operation region is the steady-speed driving region.

4. The engine control system with the variable turbocharger of claim 2,
    wherein the controller controls such that the injection timing is retarded and the opening of the vane is decreased when the operation region is the acceleration driving region.

5. The engine control system with the variable turbocharger of claim 2,
    wherein the controller controls such that the opening of the vane is decreased when the operation region is the deceleration driving region.

6. An engine control method including a variable turbocharger, an engine, and a controller controlling the variable turbocharger and the engine,
    wherein the controller executes a series of commands including:
    measuring a fuel amount supplied to a cylinder of the engine and a required torque of the engine;

determining whether an operation region divided into a plurality of driving regions including a steady-speed driving region, an acceleration driving region, or a deceleration driving region is the steady-speed driving region, the acceleration driving region, or the deceleration driving region from the fuel amount supplied to the cylinder and the required torque of the engine; and controlling injection timing of fuel injected into the cylinder and opening of a vane provided in the turbocharger, wherein the plurality of driving regions are determined by comparing a predetermined value with an absolute value of a differential value of the fuel amount supplied to the cylinder or an absolute value of a differential value of the required torque of the engine.

7. The engine control method of claim 6,
wherein determining the operation region comprises:
differentiating the fuel amount supplied to the cylinder or the required torque of the engine; and
determining whether the differential value of the fuel amount or the required torque is greater than zero.

8. The engine control method of claim 7,
wherein the controller determines that the operation region is the steady-speed driving region when the absolute value of the differential value of the fuel amount or the absolute value of the differential value of the required torque of the engine is less than the predetermined value.

9. The engine control method of claim 7,
wherein the controller determines that the operation region is the acceleration driving region when the absolute value of the differential value of the fuel amount supplied to the cylinder or the absolute value of the differential value of the required torque of the engine is greater than or equal to the predetermined value, and the differential value of the fuel amount or the differential value of the required torque is greater than zero.

10. The engine control method of claim 7,
wherein the controller determines that the operation region is the deceleration driving region when the absolute value of the differential value of the fuel amount supplied to the cylinder or the absolute value of the differential value of the required torque of the engine is greater than or equal to the predetermined value and the differential value of the fuel amount or the differential value of the required torque is less than zero.

11. The engine control method of claim 6, wherein the controller controls such that that the injection timing is advanced and the opening of the vane is increase when the operation region is the steady-speed driving region.

12. The engine control method of claim 6, wherein the controller controls such that the injection timing is retarded and the opening of the vane is decreased when the operation region is the acceleration driving region.

13. The engine control method of claim 6, wherein the controller controls such that the opening of the vane is decreased when the operation region is the deceleration driving region.

* * * * *